(12) United States Patent
Muskalla et al.

(10) Patent No.: US 6,429,408 B2
(45) Date of Patent: Aug. 6, 2002

(54) COOKING DEVICE

(75) Inventors: Michael Muskalla, Mainz; Bernd Schultheis, Schwabenheim; Evelin Weiss, Mainz, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/738,556

(22) Filed: Dec. 15, 2000

(30) Foreign Application Priority Data

Dec. 18, 1999 (DE) .......................................... 199 61 245

(51) Int. Cl.[7] ................................................ F27D 11/00
(52) U.S. Cl. ...................... 219/429; 219/725; 220/366.1
(58) Field of Search ................................ 219/429, 433, 219/451.1, 725, 461, 727, 432; 99/403, 422; 220/429, 366.1, 407; 426/107

(56) References Cited

U.S. PATENT DOCUMENTS

| 4,492,853 A | * | 1/1985 | Lam ........................... 219/432 |
| 5,046,633 A | * | 9/1991 | Chang ........................ 220/407 |
| 5,097,107 A | * | 3/1992 | Watkins et al. ............. 219/727 |
| 5,129,314 A | * | 7/1992 | Hu .............................. 99/422 |
| 5,415,082 A | * | 5/1995 | Nagao ........................ 99/403 |
| 5,643,481 A | * | 7/1997 | Brotzki et al. .............. 219/461 |
| 5,834,046 A | * | 11/1998 | Turpin et al. ................ 426/107 |
| 5,951,899 A | * | 9/1999 | Eichler et al. ............. 219/451.1 |
| 6,002,111 A | * | 12/1999 | Beugnot et al. ............ 219/433 |
| 6,105,810 A | * | 8/2000 | Daenen et al. ............ 220/366.1 |
| 6,172,339 B1 | * | 1/2001 | Thevenin .................... 219/429 |
| 6,175,105 B1 | * | 1/2001 | Rubbfright et al. ......... 219/725 |
| 6,262,398 B1 | * | 7/2001 | Busquets et al. ........... 219/429 |

FOREIGN PATENT DOCUMENTS

DE             2934215          * 4/1981          ........... A47B/77/06

* cited by examiner

*Primary Examiner*—Teresa Walberg
*Assistant Examiner*—L Fastovsky
(74) *Attorney, Agent, or Firm*—Pauley Petersen Kinne & Erickson

(57) ABSTRACT

A cooking device with a curved-shaped bowl having an inner surface that surrounds a cooking space. To allow such a cooking device to be used in a user-friendly way, the bowl is of a hard glass or a glass ceramic, and the bowl bears an edge that surrounds in a region of a bowl edge.

26 Claims, 5 Drawing Sheets

COOKING DEVICE

BACKGROUND OF THE INVENTION

1. Field of the Invention

This invention relates to a cooking device with a curved-shaped bowl, which has an inner surface that surrounds a cooking space.

2. Description of Related Art

In keeping with its Far Eastern origin, such a cooking device made up of spherically and aspherically curved surfaces is also referred to as a wok.

There are known woks with bowls of cast iron, high-grade steel or aluminum. The nature of the material results in the inner surface of the woks having large pores. Items being cooked stick to the inner surface of the wok, which makes cleaning difficult.

When cooking with the wok, firstly meat, vegetables, rice and the like are flash-fried separately in the center of the wok, where it is hottest, and then pushed toward the cooler edge. Finally, all the ingredients are mixed together again and pushed back into the center of the wok. In the case of the known metal woks, as cooking continues the bowl is also greatly heated in the transitional region adjoining the center. A desired effect is lost as a result. The flash-fried meat, vegetables, and the like then undergo a subsequent cooking effect when they are pushed into the edge region.

SUMMARY OF THE INVENTION

It is one object of this invention to provide a cooking device which is user-friendly to handle.

This object is achieved with a bowl made of hard glass or glass ceramic and by the bowl bearing an edge surround in the region of the bowl edge.

The surface properties of the hard glass or glass ceramic are such that remains of food are unlikely to stick to the inner surface of the bowl. This makes it easier to clean. The hard glass or glass ceramic has a low thermal conductivity. Consequently, the typical cooking properties of a wok can be enhanced. The bowl can be selectively heated in the central region with a heating device. The side region, adjoining the central region, remains reliably at a uniformly low temperature level.

With the edge surround of this invention, the user friendliness of the cooking device is further improved. The edge surround may at the same time be designed so that it protects the bowl edge from damage, such as shell-chips, cracks or rupture. It is also possible for the edge surround to assume a holding function.

According to this invention, the edge surround holds the bowl edge inclined with respect to the horizontal from underneath with a supporting portion. This produces a form fit between the edge surround and the bowl whenever the bowl is lifted in the vertical direction. In order to protect the bowl edge from laterally acting mechanical forms of loading, the edge surround may have a side shroud which covers the bowl edge on the outside, at least in certain regions.

According to a preferred embodiment of this invention, the edge surround has a top side, which has an upwardly directed terminating face. The top side extends beyond the bowl edge and/or the top side extends into the surrounding region away from the bowl. If the bowl edge is overhung by the top side, then it is protected. The fact that the top side extends into the surrounding region away from the bowl means that different functions can be realized. For example, it is possible for the overhanging part of the top side to be used for the holding function.

For a visually attractive appearance, the top side may also have a design.

For fixing the edge surround to the bowl, an adhesive bond may be provided.

In order to prevent bits of food from collecting between the edge surround and the inner surface of the bowl, according to this invention, the flange has at its free end a sealing lip which bears against the inner surface and seals the region enclosed by the edge surround and the bowl edge from the cooking space.

The cooking device can be produced cost-effectively whenever the edge surround is formed onto the bowl edge, for example molded on or pressed on.

For improved ease of handling, the edge surround may bear one or more grips, which protrude laterally beyond the edge surround. The grips can rise vertically upward.

If the cooking device is used as a table-top cooking appliance, a body or a load-bearing frame can be connected to the edge surround. The body may be formed onto the edge surround in one piece. The bowl is held from underneath by the body. A supporting unit bears the body and consequently also the bowl.

For safety reasons, in the case of a table-top appliance the bowl is encapsulated. For this purpose, the body has a panel which completely surrounds the outer wall of the bowl. At the bottom, an opening is provided in the paneling of the body. This opening can be closed by a load-bearing part. The load-bearing part accommodates a heating element, which is held in the space surrounded by the body and the bowl.

In a cooking device according to this invention the edge surround has a shaped formation, at which at least one operator control element or indicating element is integrated. Switches, rotary controls or touch-control regulators can be used, for example, as operator control elements.

The edge surround preferably has a temperature-resistant, glass-fiber-reinforced plastic, preferably a thermoset material. It is also conceivable to use a metal or a plastic-metal composite material for the edge surround.

BRIEF DESCRIPTION OF THE DRAWINGS

This invention is explained in more detail in view of embodiments shown in the drawings, wherein.

DESCRIPTION OF PREFERRED EMBODIMENTS

Figure 1:
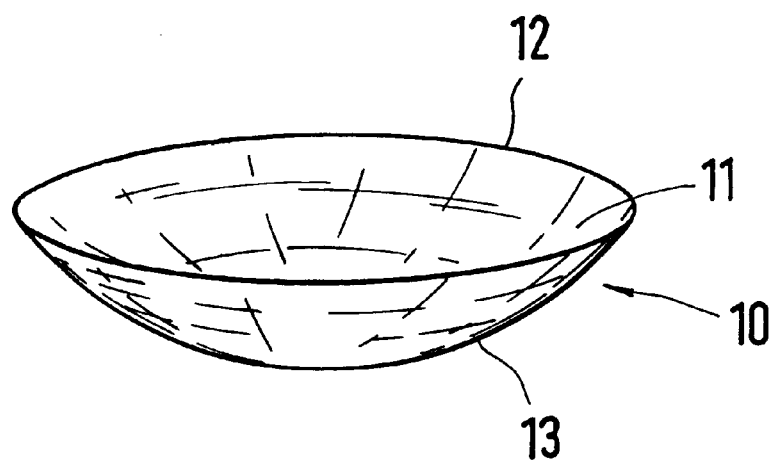
FIG. 1 shows a bowl of a cooking device in a perspective side view.

In FIG. 1, a bowl 10 of a cooking device is represented. The bowl 10 is either of hard glass or of glass ceramic. The hard glass or the glass ceramic has a correspondingly low coefficient of linear expansion. The bowl 10 is spherically curved and has an inner surface 11, which surrounds a cooking space. On its open side, the bowl 10 has a bowl edge 12 running linearly around the periphery. On the outside, the bowl 10 is terminated by an outer wall 13.

Figure 2:
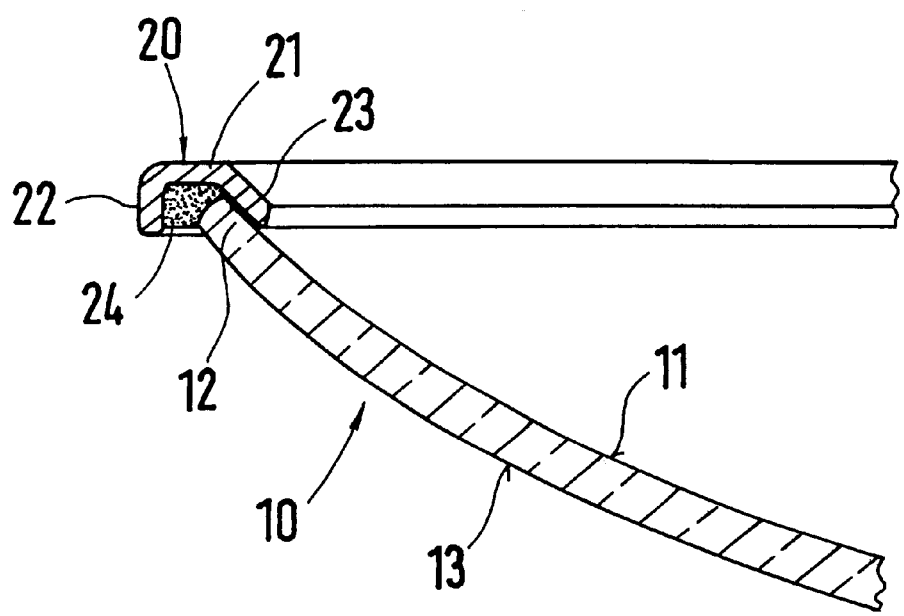
FIG. 2 shows an edge detail of a cooking device in a partial cross-sectional side view.

The bowl 10 represented in FIG. 1 may have an edge surround 20, as FIG. 2 illustrates. The edge surround 20 is in this case designed as a plastic profile running around the periphery or part of the way around it. A glass-fiber-reinforced, temperature-resistant thermoset material is preferably used for the plastic profile. The edge surround 20 has a flange 23, which extends in the direction of the cooking space. The flange 23 rests on the inner surface 11 of the bowl 10. Because the edge surround 20 runs about the periphery, the flange 23 centers the edge surround 20 with respect to the bowl 10. The flange 23 is designed so that it is tapered at its free end, to form a sealing lip. The sealing lip rests on the inner surface 11 of the bowl 10 and prevents soiling from being able to get into the region between the edge surround 20 and the inner surface 11. The flange 23 adjoins a horizontal top side 21. The top side 21 extends beyond the bowl edge 12 and into the region away from the cooking space of the bowl 10. Adjoining the top side 21 is a vertical side shroud 22. Both the top side 21 and the side shroud 22 proceed at a distance from the bowl edge 12. This has the effect of producing between the bowl edge 12 and the edge surround 20 a receiving space which can be filled with an adhesive bonding composition 24, for example a silicone adhesive. An integral bond between the bowl 10 and the edge surround 20 is established by means of the bonding composition 24. An optimized production process during bonding to the bowl 10 is possible with the configuration of the edge surround 20. For this purpose, the edge surround 20 may be held with its top side 21 downward. In this position, the bowl 10 is placed onto the flange 23. The bonding composition 24 can then be fed in and subsequently cured. The concealed arrangement of the bonding joint also has a visually favorable effect. Moreover, both the bonding composition 24 and the edge surround 20 protect the bowl edge 12 from mechanical forms of damage.

Figure 3:
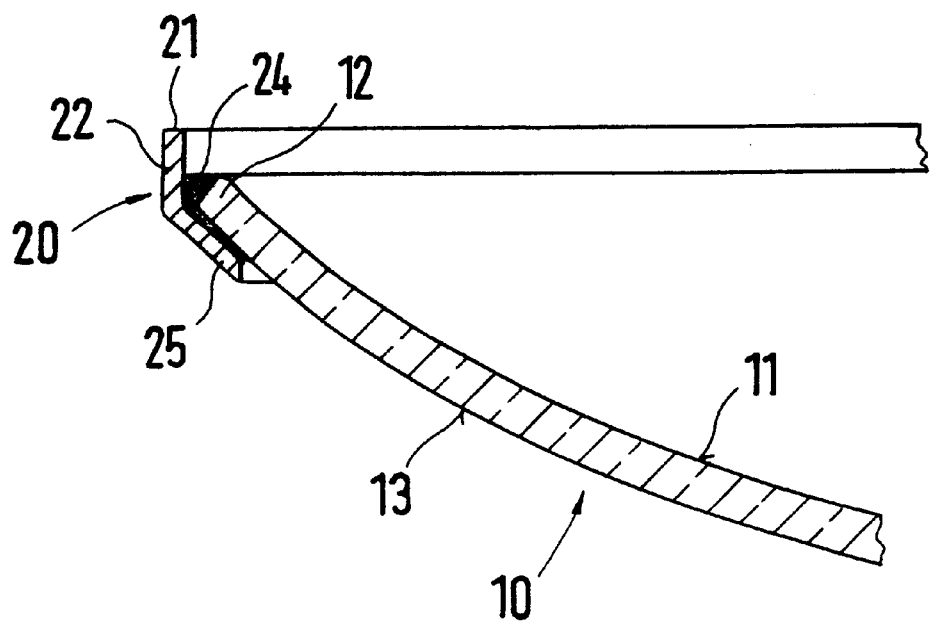
FIG. 3 shows an edge detail of a cooking device in a partial cross-sectional side view.

An alternative design of the edge surround 20 is shown in FIG. 3. As this representation reveals, the edge surround 20 has a supporting portion 25, which holds the bowl edge 12 inclined with respect to the horizontal, from below. Consequently, a positive connection is produced in the vertical direction by means of the supporting portion 25. The supporting portion 25 adjoins the side shroud 22. The side shroud 22 also forms the upper horizontal top side 21. The edge surround 20 is designed to run around the periphery. Between the supporting portion 25 and the side shroud 22 and the bowl edge 12 there is a receiving space, into which the adhesive bonding composition 24 can be supplied from the upper side. In order to prevent the adhesive bonding composition 24 from running out of the receiving space in the uncured state during production, the supporting portion 25 bears against the outer wall 13 of the bowl 10 with a sealing lip.

Figure 4:
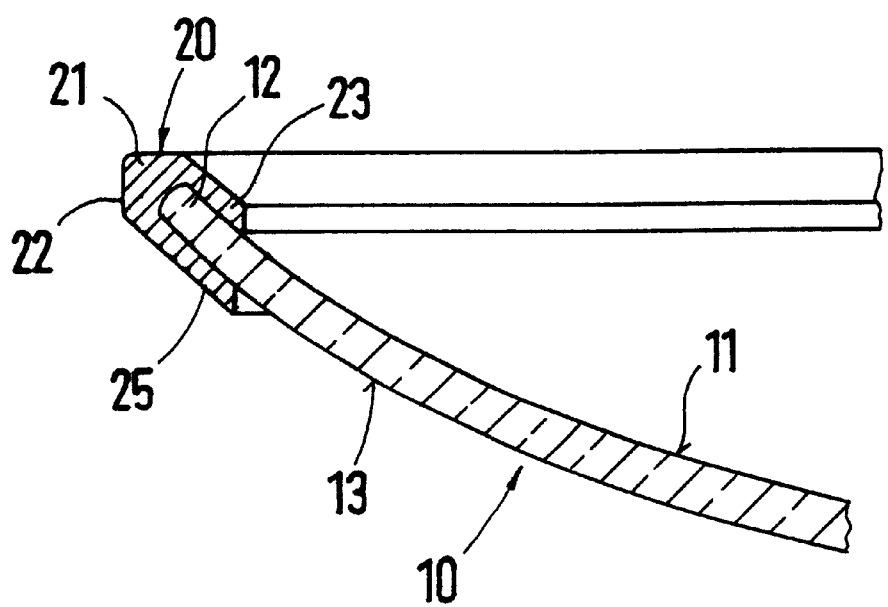
FIG. 4 shows an edge detail of a cooking device in a partial cross-sectional side view.

FIG. 4 shows an edge surround 20 which is of plastic and is either molded or pressed onto the bowl edge 12. The edge surround 20 has a supporting portion 25, holding the bowl from underneath. The supporting portion 25 merges with the side shroud 22. The side shroud 22 bears the top side 21, which for its part merges in turn with the flange 23. The edge surround 20 encloses the bowl edge 12 on all sides, so that an optimum protection of the edge is obtained. In order to prevent the edge surround 20, which is made of plastic, from introducing stress into the bowl 10 during the production process because of shrinkage effects, shrinkage-absorbing elements may be provided.

Figure 5:
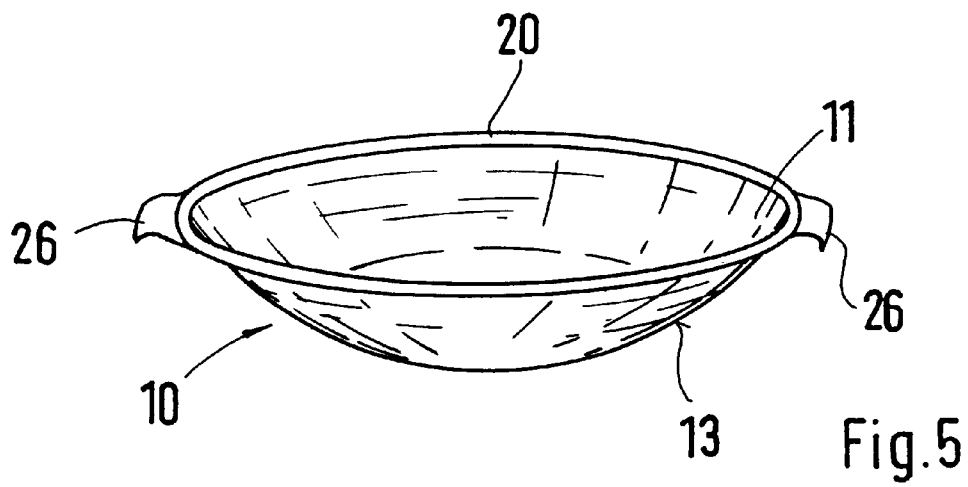
FIG. 5 shows a cooking device with an edge surround in a perspective side view.

A type of an edge surround 20 is shown in FIG. 5. The edge surround 20 has two laterally protruding grips 26. The grips 26 may be formed in one piece onto the edge surround 20. In the case of the exemplary embodiments according to FIGS. 2 to 4, the grips 26 may, for example, be formed onto the side shroud 22.

Figure 6:
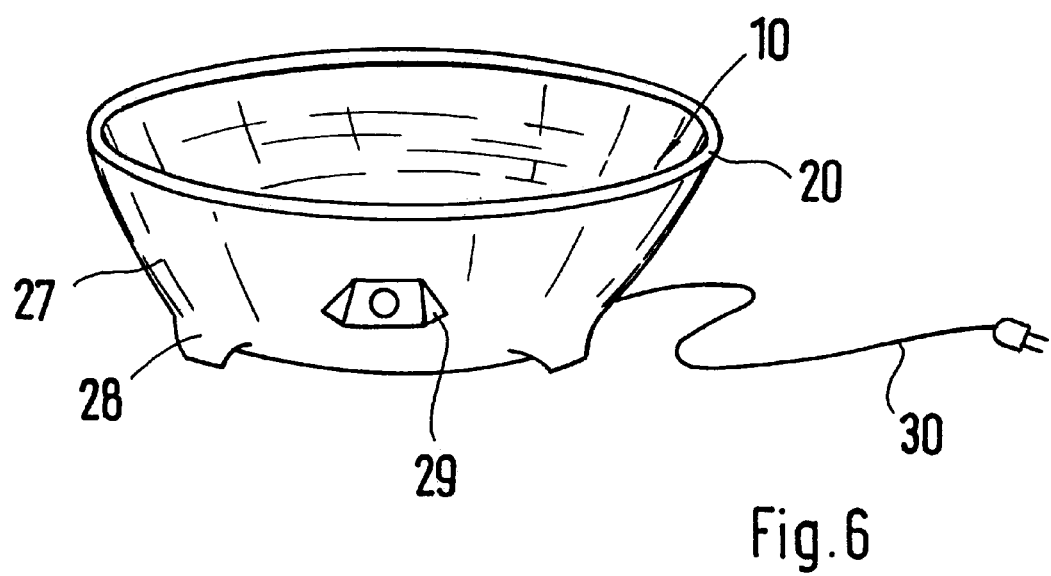
FIG. 6 shows a cooking device which can be used as a table-top appliance, in a perspective side view.

In FIG. 6, a cooking device which can be used as a table-top appliance is represented. The cooking device has in turn the bowl 10 represented in FIG. 1. The bowl 10 is surrounded at the bowl edge 12 by the edge surround 20. The edge surround 20 adjoins in one piece with a body 27. The body 27 has a panel which surrounds the bowl 10 on the outside. In the bottom region, the panel has standing feet 28, by means of which the cooking device can be placed on a level underlying surface. Fitted on the body 27 of the edge surround 20 are operator control elements 29, by means of which a heating device held in the body can be controlled. The heating device can be connected to a voltage supply by means of a connecting cable 30.

Figure 7:
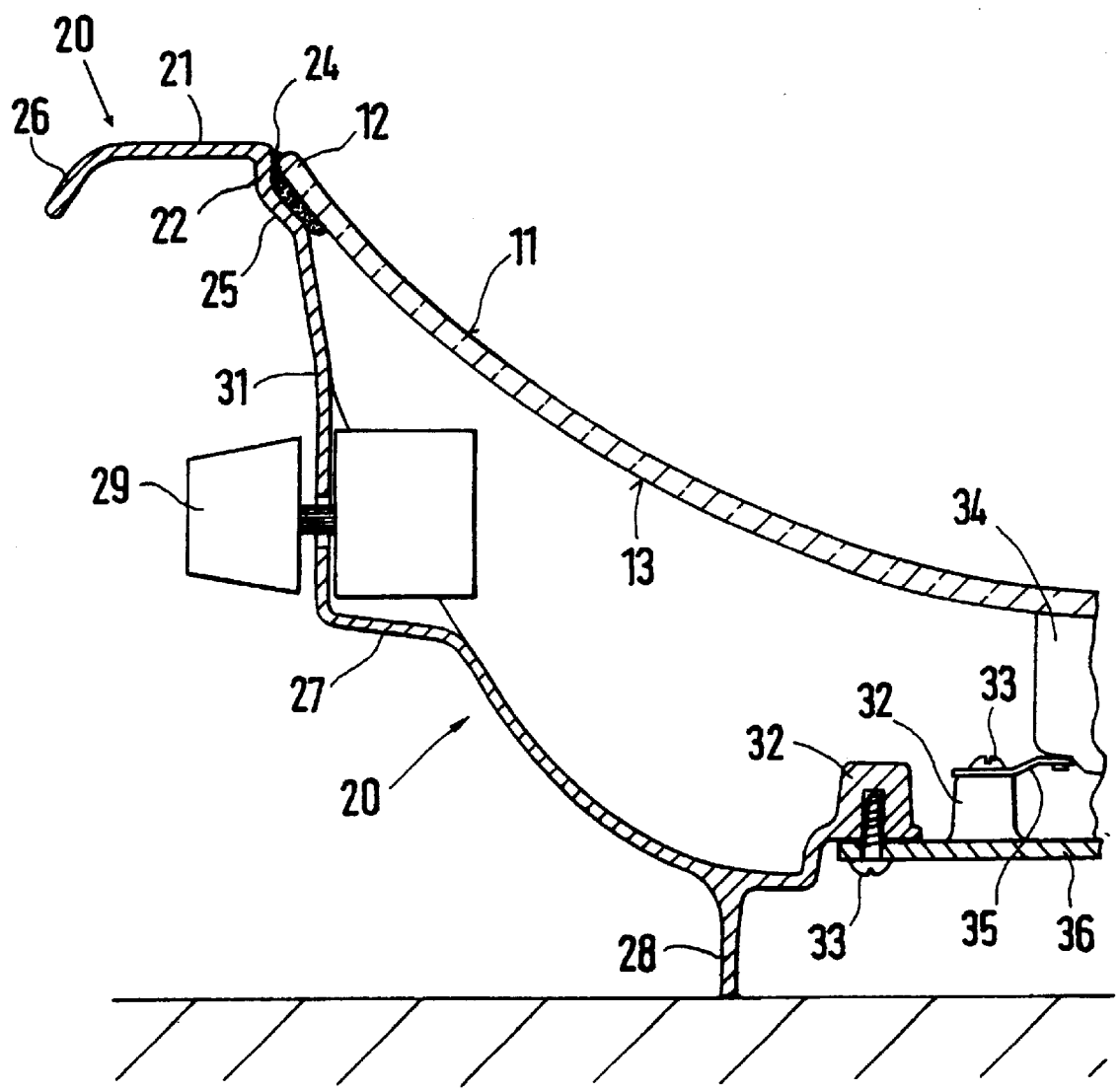
FIG. 7 shows a detail of the cooking device according to FIG. 6 in a partial cross-sectional side view.

FIG. 7 shows a partial cross-sectional side view of a detail of the cooking device according to FIG. 6. As this representation reveals, the edge surround 20 has adjoining its horizontal top side 21 a downwardly angled-away grip 26. The bowl 10 is adhesively bonded to the edge surround 20 in the region of the side shroud 22 and the supporting portion 25 by means of adhesive bonding composition 24. The body 27 of the edge surround 20 has a lateral shaped portion 31 with a vertical installation face. Fitted in this installation face is an operator control element 29. In the present case, a rotary control is used as the operator control element 29. It is also possible for switches or touch-control elements or indicating elements to be used. On the bottom side, an opening is cut out from the body 27. This opening can be closed by means of a load-bearing part 36. For fastening of the load-bearing part 36, fastening elements 32 are connected in one piece to the body 27. Fastening screws 33 can be inserted through fastening receptacles of the load-bearing part 36 and screwed into the threaded receptacles of the fastening elements 32. Further fastening elements 32, which are designed as screw domes, are formed on the load-bearing part 36. Heating elements 34 can be supported on the fastening elements 32 by means of springs 35. The heating elements 34 are braced against the outer wall 13 of the bowl 10 and held in intimate contact with the bowl 10 by means of the springs 35, so that good heat transfer can occur.

Figure 8:
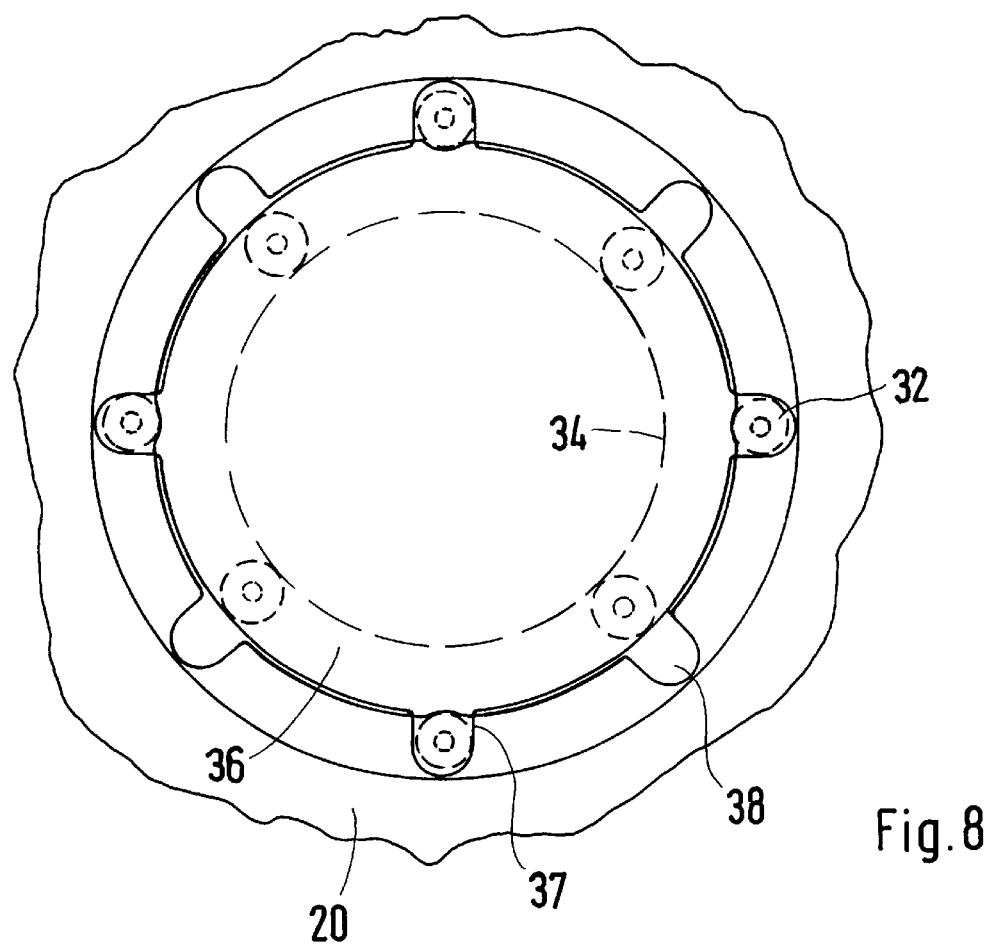
FIG. 8 shows a cutout of the cooking device according to FIG. 6, in a bottom view.

The load-bearing part 36 is produced in one piece with the body 27. In FIG. 8, a bottom view of the cooking device according to FIG. 7 is represented. As this drawing illustrates, the load-bearing part 36 has projections 37. The body 27 has corresponding clearances 38. In the production state, the projections 37 are accommodated in the clearances 38. The load-bearing part 36 is formed onto the body 27 by predetermined breaking points. These predetermined breaking points allow the load-bearing part 36 to be removed from the body 27. Subsequently, as FIG. 8 illustrates, it is rotated with respect to the body 27 and screwed by the fastening elements 32.

Figure 9:
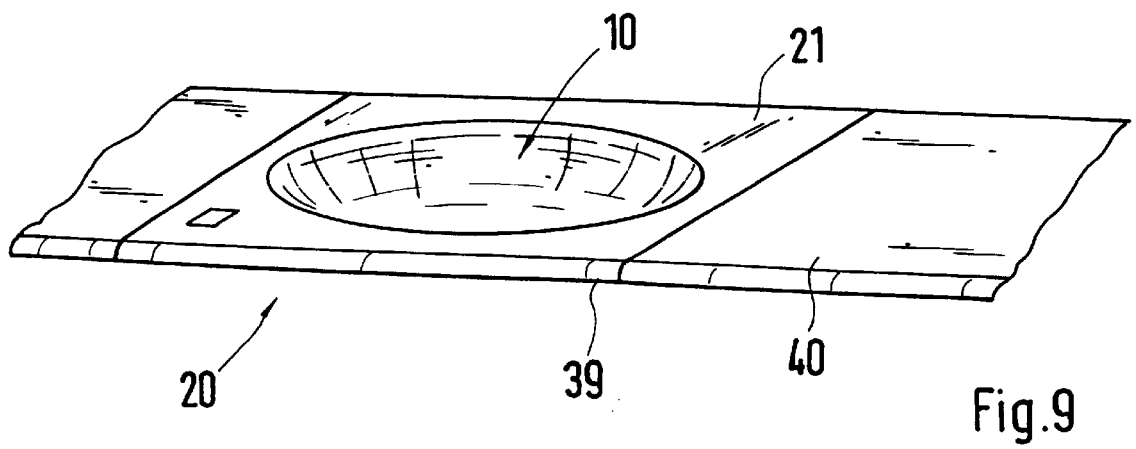
FIG. 9 shows a cooking device built into a worktop.

FIG. 9 shows a further embodiment of a cooking device. According to this, the cooking device has the bowl 10 shown in FIG. 1, the bowl edge 12 of which is surrounded by an edge surround 20. The edge surround 20 has a top side 21, which forms a depositing surface. The overall depth of the top side 21 is chosen to correspond to the depth of a standard worktop 40. Consequently, the cooking device can be integrated into a worktop 40. The top side 21 is terminated at the front by an edge 39.

What is claimed is:

1. In a device with a curved-shaped bowl having an inner surface that surrounds a cooking space, the improvement comprising: the bowl (10) being of one of a hard glass and a glass ceramic, and a separate edge surround (20) positioned to bear against a bowl edge (12) of the bowl (10).

2. In the cooking device according to claim 1, wherein the edge surround (20) holds the bowl edge (12) inclined with respect to a horizontal from below by a supporting portion (25).

3. In the cooking device according to claim 2, wherein the edge surround (20) has a side shroud (22) which covers the bowl edge (12) on an outside at least in certain regions.

4. In the cooking device according to claim 3, wherein at least one of the edge surround (20) has a top side (21) with an upwardly directed terminating face, the top side (21) extends beyond the bowl edge (12), and the top side (21) extends into a surrounding region away from the bowl (10).

5. In the cooking device according to claim 4, wherein an adhesive bonding composition (24) is in a space between the edge surround (20) and the bowl (10).

6. In the cooking device according to claim 5, wherein the edge surround (20) has a flange (23) which bears against the inner surface (11) of the bowl (10).

7. In the cooking device according to claim 6, wherein the flange (23) has at a free end a sealing lip which bears against the inner surface (11) and seals the region enclosed by the edge surround (20) and the bowl edge (12) from the cooking space.

8. In the cooking device according to claim 7, wherein the edge surround (20) is formed directly on the bowl edge (12).

9. In the cooking device according to claim 8, wherein the edge surround (20) bears at least one grip (26) which protrudes laterally beyond the edge surround (20).

10. In the cooking device according to claim 9, wherein the edge surround (20) adjoins one of a body (27) and a load-bearing frame and the body (27) holds the bowl (10) from below and is positionable with a supporting unit on an underlying surface.

11. In the cooking device according to claim 10, wherein the body (27) completely surrounds the outer wall (13) of the bowl (10) with a panel, at a bottom is an opening in the panel of the body, the opening can be closed by a load-bearing part (36), and a heating element (34) is fastened on the load-bearing part (36) and is surrounded by the body (27) and the bowl (10).

12. In the cooking device according to claim 11, wherein the edge surround (20) has a shaped formation (31) at which at least one of an operator control element and an indicating element (29) is fixed.

13. In the cooking device according to claim 12, wherein the edge surround (20) encloses the bowl edge (12) about a periphery.

14. In the cooking device according to claim 13, wherein the edge surround (20) is of one of a plastic, a temperature-resistant thermoplastic, a temperature-resistant glass-fiber-reinforced thermoset material, a metal and a plastic-metal composite material.

15. In the cooking device according to claim 1, wherein the edge surround (20) has a side shroud (22) which covers the bowl edge (12) on an outside at least in certain regions.

16. In the cooking device according to claim 1, wherein at least one of the edge surround (20) has a top side (21) with an upwardly directed terminating face, the top side (21) extends beyond the bowl edge (12), and the top side (21) extends into a surrounding region away from the bowl (10).

17. In the cooking device according to claim 1, wherein an adhesive bonding composition (24) is in a space between the edge surround (20) and the bowl (10).

18. In the cooking device according to claim 1, wherein the edge surround (20) has a flange (23) which bears against the inner surface (11) of the bowl (10).

19. In the cooking device according to claim 1, wherein a flange (23) which bears against the inner surface (11) of the bowl (10) has at a free end a sealing lip which bears against the inner surface (11) and seals the region enclosed by the edge surround (20) and the bowl edge (12) from the cooking space.

20. In the cooking device according to claim 1, wherein the edge surround (20) is formed directly on the bowl edge (12).

21. In the cooking device according to claim 1, wherein the edge surround (20) bears at least one grip (26) which protrudes laterally beyond the edge surround (20).

22. In the cooking device according to claim 1, wherein the edge surround (20) adjoins one of a body (27) and a load-bearing frame and the body (27) holds the bowl (10) from below and is positionable with a supporting unit on an underlying surface.

23. In the cooking device according to claim 22, wherein the body (27) completely surrounds the outer wall (13) of the bowl (10) with a panel, at a bottom is an opening in the panel of the body, the opening can be closed by a load-bearing part (36), and a heating element (34) is fastened on the load-bearing part (36) and is surrounded by the body (27) and the bowl (10).

24. In the cooking device according to claim 1, wherein the edge surround (20) has a shaped formation (31) at which at least one of an operator control element and an indicating element (29) is fixed.

25. In the cooking device according to claim 1, wherein the edge surround (20) encloses the bowl edge (12) about a periphery.

26. In the cooking device according to claim 1, wherein the edge surround (20) is of one of a plastic, a temperature-resistant thermoplastic, a temperature-resistant glass-fiber-reinforced thermoset material, a metal and a plastic-metal composite material.

* * * * *